Oct. 23, 1934.  A. HANSEN  1,977,911

PIPE JOINT

Filed Oct. 4, 1933

INVENTOR
ANTON HANSEN

BY
ATTORNEY

Patented Oct. 23, 1934

1,977,911

UNITED STATES PATENT OFFICE 1,977,911

PIPE JOINT

Anton Hansen, Newark, N. J., assignor to The Universal Pipe and Radiator Company, New York, N. Y., a corporation of Maryland Application October 4, 1933, Serial No. 692,056

5 Claims. (Cl. 285—139)

This invention relates to improvements in pipe joints and particularly has reference to a machined joint of bell and spigot construction for use in a pressure line without the necessity of packing of any sort. It is a primary purpose of the invention to provide a joint of this character which will be tight whether or not the pipe sections joined have their axes in strict alinement and one which will withstand the strains to which this sort of pipe is put in the course of laying and while in use.

Heretofore machine joint pressure pipes have been subject to breakage at various points in the careless handling and use of the pipe. For example, it has been found that the bell ends of pipes of this sort are at times subjected to a shearing strain, through a weak portion at the end of the bell, of sufficient magnitude to start a split and this when once begun has a tendency to continue right through. This splitting occurs particularly when the bolts at the joint are drawn up excessively and the pipe line is later expanded by a change in temperature. Another point of weakness sometimes encountered is on the spigot end of the pipe where a reduced portion that enters the bell joins the main body of the pipe.

An object of the invention has been to provide a simple, inexpensive type of joint which will effectively overcome these weaknesses in prior pipe constructions and will allow a machine joint to be made tight for all intended pressure conditions without danger of shearing or otherwise destroying the joint. A pipe joint embodying the features of the present invention will have substantially uniform strength characteristics throughout.

Figure 1:
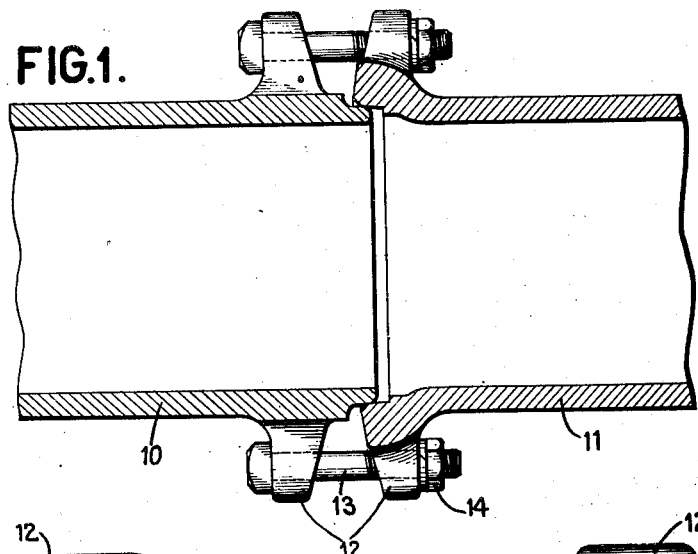
Figure 2:
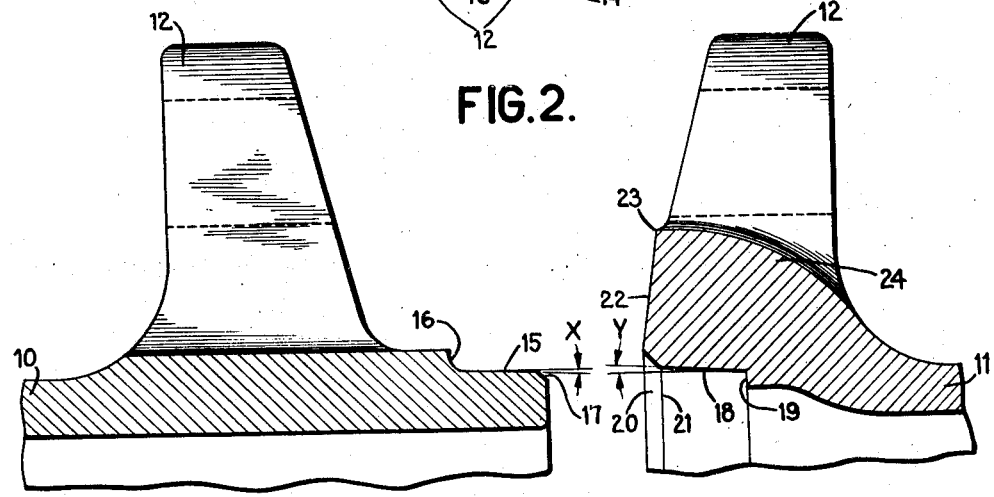
Figure 3:
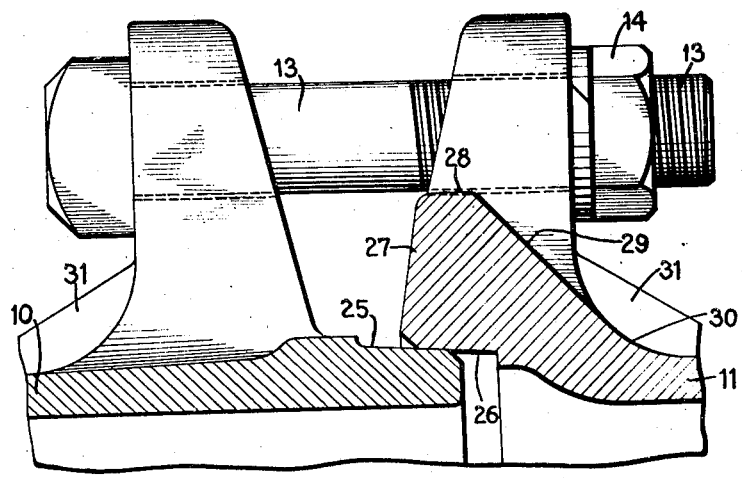

These and other objects and advantages of the invention will be more clearly understood from the detailed description of an illustrative form of the invention which will now be given in conjunction with the accompanying drawing in which:

Figure 1 is a longitudinal central section through a joint embodying features of the present invention, Figure 2 is an enlarged longitudinal, sectional view through the pipes shown in Figure 1 but with the pipes separated to more clearly illustrate the construction, and Figure 3 is a similar sectional view through a pair of pipes of modified construction joined together.

Referring now to the drawing, there is illustrated in Fig. 1 a pair of pipe sections 10 and 11 constructed and joined in accordance with the present improvements. These sections may be formed of any suitable material such as cast iron, preferably a high test grey iron. The section 10 has a reduced spigot end while the section 11 has an enlarged bell end so that the two sections may be partly telescoped. Each section carries a plurality of radially extending lugs 12. Any suitable number of these may be provided, either two or four being commonly preferred, depending upon the diameters of the pipes involved. Each lug has an aperture through it parallel with the axis of the pipe and adapted to receive a bolt 13, which, upon the tightening of a nut 14, will clamp the two sections together.

The reduced spigot end of the section 10 is provided with a machined surface 15 formed at a slight angle to the axis of the pipe. This angle, indicated at X in Fig. 2, may suitably be, for example, about 2 degrees. The inner end of the surface 15 is preferably connected with the outer surface of the main body of the pipe section by means of a well rounded fillet 16. This serves to eliminate the occasional breakages which have occurred at the spigot end of a pipe of this character when a square shoulder is provided between the spigot and the main body of the pipe. Adjacent the outer or free end of the surface 15 there is provided a beveled surface 17 preferably disposed at an angle of about 45 degrees to the axis of the pipe. The purpose of this surface will be explained hereinafter. In the machining of the surface 15 it is preferably milled to an accuracy of about .003 to .010 of an inch, depending upon the diameter of the pipe.

The bell end of section 11 is provided with a machined surface 18, reamed with suitable accuracy such as specified for surface 15, disposed at a slightly greater angle to the axis of the pipe than the surface 15. This angle which is indicated at Y in Fig. 2, may suitably be approximately 2½ degrees. It will be understood that in the assembly of the sections of pipe the surfaces 15 and 18 will cooperate and by virtue of their slightly different angles they will permit the two pipe sections to have their axes angle slightly with relation to each other. At the inner end of the surface 18 there is provided a shoulder 19 which may either be joined abruptly with the surface 18, as shown, or along a well rounded fillet. The mouth of the bell is provided with a chamfered surface 20 disposed preferably at an angle of about 45 degrees to the axis of the pipe and intersecting the surface 18 along a circular edge 21. The end face 22 of the bell is inclined at a small angle from the outer end of the bevelled surface 20 to an outer circular edge 23. The inclination of the end face 22 is preferably such that a plane through the edge 23, perpendicular to the axis of the pipe, will pass through some point on the bevelled surface 20, or will not pass inwardly of the circular edge 21. For this purpose the angle of inclination of the face 22 to a plane perpendicular to the axis of the pipe should not be greater than about 8 degrees. A slightly greater angle may be permissible under some circumstances but it is considered generally preferable to employ an angle of 8 degrees or less. The outer surface 24 of the bell may be conveniently curved along a sweeping arc, which is of sufficiently large radius to provide a substantially uniform thickness of metal throughout the small, annular portion having, or bounded on the inner side by, the surface 18. This curved surface may be merged into the main body of the section 11 in any convenient way, such as by the smooth, large radius curve shown.

When the two pipe sections are joined, as shown in Figure 1, the surfaces 15 and 18 will cooperate along a narrow circular band, theoretically only a line. If the two sections are inclined at a slight angle to each other, this band will lie in a plane at an angle to the axes of the pipes. For example, at one point the outer edge of the surface 15 may cooperate with a point on the surface 18 lying well in toward the shoulder 19, while at a diametrically opposite point the cooperation will be between the edge 21 of the bell and a point on the surface 15 well in toward the fillet 16. It will be seen that by the provision of the bevelled or chamfered surfaces 17 and 20, the cooperation between the two pipe ends will be confined to points some distance in from the end faces of the pipe sections. In this way it is insured that no strain will be imparted to the bell end, for example, at the very end face of the bell. It has been found that when a severe strain is permitted to be applied to the bell at its extreme end, there is danger of starting a split by virtue of the radial force acting upon a relatively thin section of metal. By providing the chamfered surfaces and arranging the outer edge 23 of the end face of the bell in the manner explained and shown, it is insured that any force tending to split the bell is resisted by a maximum thickness of metal at all points. So also by the provision of the bevelled surface 17 and the fillet 16 at the spigot end of section 10, the danger of breakage of the spigot end under severe strain is substantially eliminated. The bevelled surface serves to prevent the application of force at the extreme end of the spigot. At the same time the fillet 16 strengthens the juncture between the spigot and the main body of the pipe. By the combination of features explained and disclosed in Figure 2, it has been found that a pipe and joint of substantially uniform strength characteristics has been produced. There is no point of special weakness at which it may be predicted that the joint will almost certainly fail upon the application of an excessive strain. Accordingly, for a given amount of metal used in the pipe sections a joint of maximum strength is produced by the present improvements. The metal at all points is used to maximum advantage.

Referring now to Fig. 3, there is illustrated a modified form of construction in which the spigot end of one section is provided, as before, with a machined, tapered surface 25 while the bell end of the other section is provided with a machined surface 26 inclined at a slightly greater angle to the axis of the pipe. The end face 27 of the bell is inclined at a slight angle to a plane perpendicular to the axis of the pipe, this angle, as before, being preferably not more than about 8 degrees. If desired, as shown, chamfered surfaces, similar to 17 and 20 of Figure 2, may be employed in this construction, as may also a fillet corresponding to fillet 16 of Figure 2. The usual bolt lugs and bolts may be employed, as indicated, to clamp the pipe sections together. The principal feature of this construction, as distinguished from that of Figure 2, is in the form of the bead at the bell end. This, as shown, may have a substantially cylindrical, outer surface 28 and a substantially conical rear surface 29 which is merged with the main body of the pipe along a sweeping curve 30. The advantage of this construction is simply in the saving of metal which it makes possible. The surface 29 is, for the most part, well within a curved surface similar to surface 24 of Figure 2, which would ordinarily have been provided. In other words, while there is a slight addition of metal adjacent the outer edge of this surface where it intersects the surface 28, there is greater saving in metal at the opposite end of the surface where it merges into the curved surface 30. In order to offset the weakening of the bolt lugs brought about by this modification, it is necessary to provide flanges or ribs 31 extending rearwardly from the inner faces of the bolt lugs toward the main body of the pipe. While this construction is somewhat more complicated than that of Figure 2, it involves some saving in metal and accordingly produces a lighter and slightly more economical construction. By the provision of the substantially cylindrical surface 28, any tearing stress set up in the bell by the cooperation of the surfaces 25 and 26 will be resisted by a substantially uniform thickness of metal throughout.

It will be understood, of course, that a large number of pipe sections will ordinarily be provided with some or all of the bell and spigot features hereinbefore explained so that a continuous pipe of any desired length may be produced by joining the sections in the manner indicated.

While several illustrative forms of pipe joints embodying various features of the present invention have been disclosed in considerable detail, it will be understood that various changes may be made in the several forms without departing from the general spirit and scope of the invention as defined by the appended claims.

What I claim is:

1. A pipe joint between two cast sections of pipe which comprises a spigot end on one section machined at a small angle to the axis of the pipe, a bell end on the other section having its inner surface machined at a slightly greater angle to the axis of the pipe, the mouth of the bell being chamfered at such an angle that it will never engage the spigot end of the connected section, and the bell having its end face inclined at such an angle that a plane perpendicular to the pipe axis passing through the outer edge of said end face will intersect the chamfered surface of the mouth.

2. A pipe joint between two cast sections of pipe which comprises a spigot end on one section machined at a small angle to the axis of the pipe, a bell end on the other section having its inner surface machined at a slightly greater angle to the axis of the pipe, the mouth of the bell being chamfered at such an angle that it will never engage the spigot end of the connected section, and the bell having its end face inclined at an angle of not more than 8° to a plane perpendicular to the axis of the pipe.

3. A pipe joint between two cast sections of pipe which comprises a spigot end on one section and a bell end on the other section, said ends having cooperating machined surfaces each at a single definite angle to the axis of the pipe, the surface on one end being at a slightly greater angle than the surface on the other end, the end face of the bell being inclined at such a small angle to a plane perpendicular to the pipe axis and the outer surface of the bell being such that the metal of the bell is of substantially the same maximum thickness throughout the annular portion bearing the cooperating surface, and its thickness is no greater at any point than at the forward end of said cooperating surface.

4. A pipe joint between two cast sections of pipe which comprises a spigot end on one section and a bell end on the other section, said ends having cooperating machined surfaces each at a single definite angle to the axis of the pipe, the surface on one end being at a slightly greater angle than the surface on the other end, each of said ends also having a surface adjacent said cooperating surface bevelled at such an angle that it will never engage the spigot end of the connected section, the end face of the bell being inclined at such a small angle to a plane perpendicular to the pipe axis and the outer surface of the bell being such that the metal of the bell is of substantially the same maximum thickness throughout the annular portion bearing the cooperating surface, and its thickness is no greater at any point than at the forward end of said cooperating surface.

5. A pipe joint between two cast sections of pipe of substantially uniform strength characteristics which comprises a spigot end on one section having a well rounded fillet at the point of juncture with the main body of said section, a bell end on the other section, said bell and spigot ends having machined cooperating surfaces disposed at different small angles to the pipe axis, and bevelled surfaces adjacent the free ends of said cooperating surfaces disposed at such angles that they will never be engaged by the end of the cooperating section, the metal of the annular portions bearing the cooperating surfaces of the bell and spigot being of substantially the same thickness throughout.

ANTON HANSEN.